United States Patent [19]

Young

[11] 3,957,200

[45] May 18, 1976

[54] HUMIDITY CONTROLLER

[75] Inventor: Geoffrey Allen Young, Bridgeport, Tex.

[73] Assignee: Johnson, Controls, Inc., Milwaukee, Wis.

[22] Filed: Feb. 20, 1975

[21] Appl. No.: 551,097

[52] U.S. Cl. .............................. 236/44 R; 165/21; 62/176
[51] Int. Cl.² ........................................ G05D 22/00
[58] Field of Search ............... 165/26, 21; 236/44 R, 236/44 A; 62/92, 176; 307/39; 318/624

[56] References Cited
UNITED STATES PATENTS

| | | | |
|---|---|---|---|
| 3,510,738 | 5/1970 | Iversen | 318/624 X |
| 3,535,561 | 10/1970 | Pinckaers | 165/26 X |
| 3,591,077 | 7/1971 | Alton | 165/26 |

*Primary Examiner*—William E. Wayner
*Attorney, Agent, or Firm*—Johnson, Dienner, Emrich & Wagner

[57] ABSTRACT

A humidity controller includes a set point device, which establishes a set point for humidity within a given area, and a humidity sensor, which senses the humidity within the area, connected in a sensing network which provides a differential output voltage indicating deviations of the humidity from the set point. The output voltage selectively enables differential threshold detecting circuits which energize humidifying and dehumidifying apparatus to return the humidity to the set point value. A differential range adjust, which establishes a turnon threshold for the detecting circuits, is derived from the set point such that the turnon differential for the detecting circuits remains fixed regardless of the set point value.

15 Claims, 2 Drawing Figures

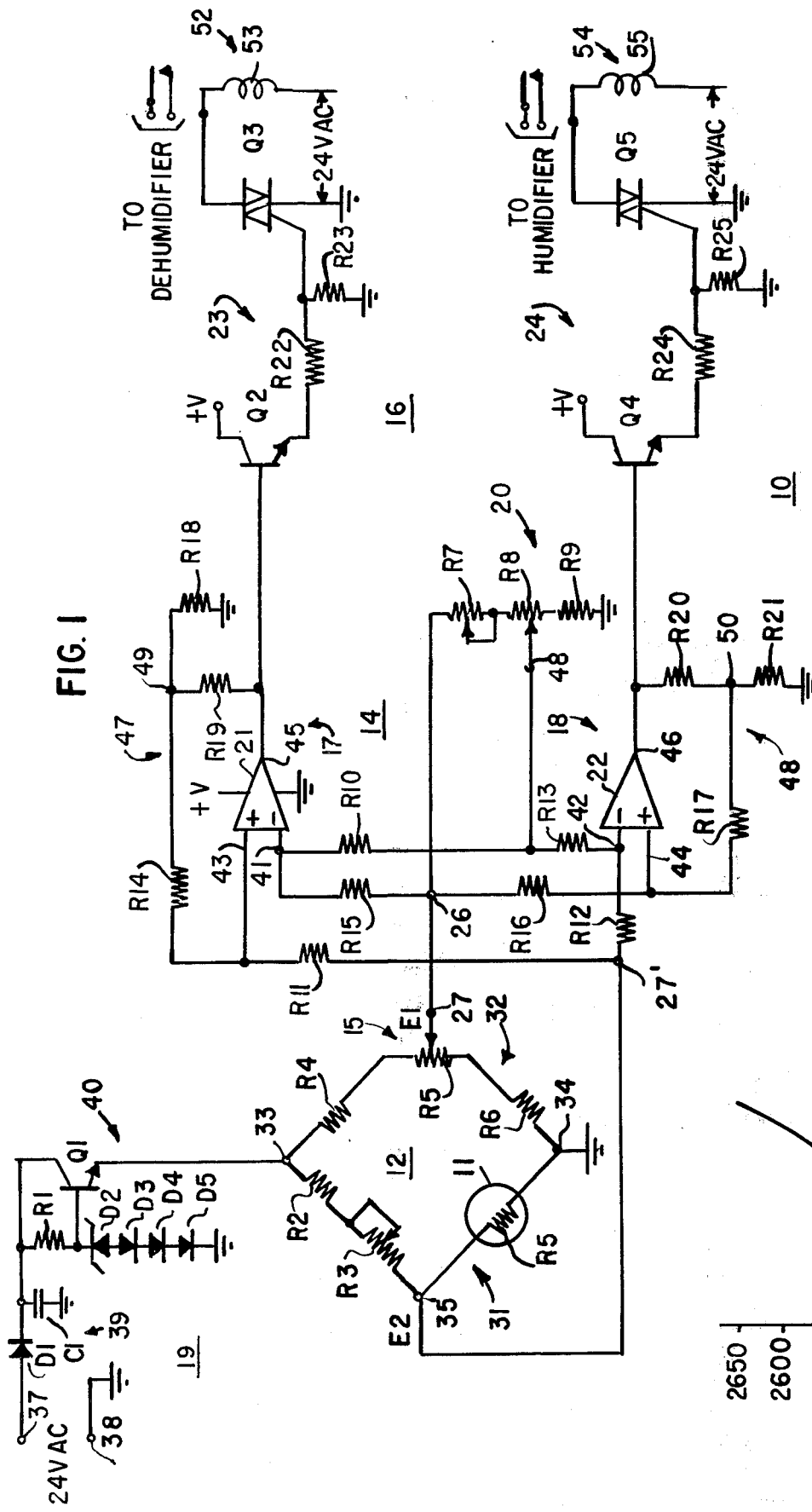

HUMIDITY CONTROLLER

BACKGROUND OF THE INVENTION

1. Field of the Invention

This invention relates to humidity controllers for controlling humidifying and dehumidifying apparatus to maintain the humidity within a given environment at a set point value, and more particularly, to a humidity controller having a differential range adjust which remains constant with adjustment of the set point.

2. Description of the Prior Art

Humidity controllers are employed in environmental control systems for controlling apparatus of the system to maintain the humidity within a given area or environment at a set point value. A humidity sensor located within the area provides an output indicative of the % relative humidity within the area, and the output is used to effect energization of humidifying or dehumidifying apparatus for increasing or decreasing the humidity within the environment in accordance with deviations of the humidity from the set point value.

Generally, the humidity controller employs a differential detector including a pair of detector circuits. A first detector circuit controls the dehumidifying apparatus, and a second detector circuit controls thee humidifying apparatus. The detector circuits have different threshold settings to permit enabling of the first detector circuit whenever the humidity as sensed by the humidity sensor increases a pre-determined amount relative to the set point which is established by a set point means and to permit the second detector circuit to be enabled whenever the humidity decreases a pre-determined amount relative to the set point. The set point means is adjustable to permit selection of a desired set point for the humidity in the area. The humidity controller also includes means for establishing differential between the threshold levels for the first and second detector circuits. It is desirable that such differential also be adjustable over a given range. In known humidity controllers, once the differential range is established for a given set point, a change in the set point will cause a change in the differential range, and thus readjustment of the differential range is necessary whenever the set point is changed. This is undesirable because in normal operation, it is desirable to change the set point from time to time to provide the desired humidity for different atmospheric conditions, and without readjustment of the differential range, the response of the humidity controller will be different whenever the set point value is changed. Therefore, it would be desirable to have a humidity controller wherein the differential range once established for a given set point remains the same even when the set point is changed.

SUMMARY OF THE INVENTION

It is therefore an object of the present invention to provide a humidity controller having an adjustable differential wherein the differential value selected remains constant regardless of set point.

It is another object of the present invention to provide a humidity controller wherein the differential range adjustment is derived from the set point.

These and other objects are achieved by the present invention which has provided a humidity controller for use in an environmental control system for controlling apparatus to maintain the humidity in a given area or environment at a set point value. The humidity controller comprises a humidity sensing means, including an adjustable set point means for establishing a set point voltage indicative of a desired value for humidity within the area and a humidity sensing element for providing a sensor voltage indicative of the relative humidity within the area. The humidity sensing means provides a differential output voltage representing the difference between the set point voltage and the sensor voltage.

A detector means, including first and second threshold detecting means, is controlled by the differential output voltage to selectively energize humidifying and dehumidifying apparatus of the system to compensate for the change in humidity in the monitored area from the set point.

The detector means includes means for providing a reference voltage to the first and second threshold detecting means to establish a differential turnon threshold for the first and second threshold detecting means. In accordance with the present invention, the reference voltage is derived from the set point voltage, and accordingly, the differential range, once established at a desired value remains fixed regardless of the set point.

The humidity controller further includes first and second switching means controlled by the first and second threshold detectors, respectively. The first switching means is operable when enabled by the first threshold detecting means to effect energization of the dehumidifying apparatus, and the second switching means is operable when enabled by the second threshold detecting means to effect energization of the humidifying apparatus.

Feedback means of the detector means controls the first and second threshold detecting means to maintain the first and second switching means enabled until the humidity within the monitored area is returned to the set point value and the sensor voltage is approximately equal to the set point voltage.

DESCRIPTION OF THE DRAWINGS

FIG. 1 is a schematic circuit drawing for the humidity controller provided by the present invention; and FIG. 2 is a part of resistance versus relative humidity sensed for a sensor employed in the circuit shown in FIG. 1.

DESCRIPTION OF A PREFERRED EMBODIMENT

General Description

Referring to the drawings, FIG. 1 is a schematic circuit diagram of exemplary embodiment for the humidity controller 10 provided by the present invention. The humidity controller 10 includes a sensing circuit 12, detecting circuits 14, output switching circuits 16, and a power supply circuit 19.

The humidity controller 10 may, for example, be employed in an air conditioning system for controlling apparatus of the system to maintain the humidity of the air in a given area or environment at a given set point value. In such application, the humidity controller 10 controls the energization of suitable humidifying and dehumidifying apparatus of the system in accordance with deviations of the humidity within the area from the set point value as sensed by a relative humidity sensing device 11 which is located within the area to monitor the humidity of the air within the area.

In the exemplary embodiment, the sensing circuit 12 is embodied as a bridge network and the relative humidity sensing device 11 is connected in one leg of the bridge network 12. The humidity sensing device may, for example, be a Cellulose Acetate Butyrate resistive-type sensing element such as the Type XC-72 Humidity Sensor commercially available from Johnson Controls, Inc. As shown in FIG. 2, which is a plot of element resistance versus % relative humidity, the resistance of the humidity sensing device varies non-linearly, the element resistance increasing in correspondence with increases in % relative humidity.

The bridge network 12 is energized by the power supply circuit 11 to provide a differential output voltage $E = E1 - E2$ between a wiper 27 of a potentiometer R5 and a node 35 of the bridge network 12. The voltage E1 is a set point voltage established by an adjustable set point device 15, embodied as a potentiometer R5. The set point voltage E1 is indicative of the desired value for the humidity for the monitored area. The voltage E2, which is determined by the resistance of the sensing element 11, is indicative of the actual humidity within the monitored area. The voltage E2 varies in accordance with changes in the resistance of the sensing element 11 causing corresponding variations in the differential output voltage E.

The differential output voltage E is extended to the detecting circuits 14 which include a pair of threshold detecting circuits 17 and 18 which are selectively enabled whenever the differential output voltage exceeds positive or negative threshold limits for the detecting circuits. Threshold detector circuit 17 serves as an upper limit detector and is enabled whenever the positive threshold level is exceeded. Threshold detector circuit 18 serves as a lower limit detector and is enabled whenever the negative threshold level is exceeded. The threshold detectors 17 and 18 include operational amplifiers 21 and 22, respectively, which operate as open loop level detectors and switch from an "off" state to an "on" state whenever the magnitude of the threshold limits are exceeded.

The upper and lower threshold settings and thus the detection range for the detector circuits 17 and 18 is established by a differential range adjust network 20. The differential range adjust network 20 provides adjustment in the detection differential for the threshold detector circuits 17 and 18 over a range of 4% to 20% change in relative humidity. As will be shown in more detail hereinafter, the differential range adjust network 20 derives a reference voltage for the amplifiers to establish the turn on thresholds for the amplifiers 21 and 22. The reference voltage is derived from the set point voltage, to permit tracking of the set point for whatever value is required for the differential range for the amplifiers 21 and 22. Accordingly, the differential range, once set remains at the selected value regardless of the set point.

The threshold detector circuits 17 and 18 control the energization of the output switching circuits 16 which include a dehumidifier switch circuit 23 and a humidifier switch circuit 24. The dehumidifier switch circuit 23 includes a transistor Q2 and a Triac Q3 which are enabled whenever operational amplifier 21 is switched to the "on" state. Switch circuit 23 energizes a control relay 52 to cause energization of a suitable dehumidifying apparatus of the system, such as an absorbtion-type humidifier (not shown) to permit dehumidified air to be supplied to the monitored area.

The humidifier switch circuit 24 includes a transistor Q4 and a Triac Q5 which are enabled whenever operational amplifier 22 is switched to its "on" state. Switch circuit 24 energizes a further control relay 54 to effect energization of a humidifier apparatus (not shown) of the system to permit humidified air to be supplied to the monitored area.

Circuit Description

The power supply circuit 19 derives a DC supply voltage $+V$ from a 24 VAC source, for example, which is connectable to input terminals 37 and 38 of the power supply circuit 19.

The power supply circuit 19 includes a rectifying portion 39 including a diode D1 and a filter capacitor C1, and a voltage regulator stage 40 including transistor Q1, a biasing resistor R1 and level setting diodes D2-D5, which enable the power supply circuit 19 to provide a DC voltage $+V$ which in the exemplary embodiment is 16VDC. The output of the power supply circuit 19 at the emitter of transistor Q1, is connected to a node 33 of the bridge network 12 and ground is connected to a node 34 of the bridge network 12.

The bridge network 12 is comprised of two parallel branches 31 and 32 which are connected between nodes 33 and 34 of the bridge network. Branch 31 is comprised of a resistor R2 and R3 a potentiometer, which are connected in series between nodes 33 and 35, and the humidity sensor 11, which is connected between nodes 35 and 34. Potentiometer R3 permits calibration of the sensing network to permit the resistance of the set point branch 32 to equal the resistance of the sensor branch 31 at the desired humidity setting. Branch 32 is comprised of a resistor R4, the resistance portion of the set point potentiometer R5, and a resistor R6 which are connected in series between nodes 33 and 34.

When the bridge network 12 is balanced, the set point voltage E1 provided at the wiper 27 of the set point potentiometer R5 equals the voltage E2 provided at node 35. Whenever the sensed relative humidity within the monitored area is not at the set point value, the bridge network 12 is unbalanced, and a differential output voltage $E = E1 - E2$ is provided between wiper 17 and node 35. The output differential is:

$$E = E1 - E2 = V \left[ \frac{R4 + Ra}{R4 + R5 + R6} - \frac{Rs}{R2 + R3 + Rs} \right] \quad (1)$$

where resistance $Ra$ is determined by the setting of potentiometer R5, and $Rs$ is the resistance of the sensing element 11.

The resistance of the sensing element 11 as a function of humidity is not linear as shown in FIG. 2. However, the set point potentiometer may be calibrated in a non-linear fashion to provide correlation between the resistance of the sensing element 11 and the set point value.

Referring to FIG. 2, it is seen that at the mid range portion (approximately 2,550 ohms) the resistance characteristic is linear, and a resistance change of approximately 3 ohms is provided per percent change in relative humidity. It can be shown that for the 16 VDC supply voltage and with the values of resistors R2+R3 equal to 2,550 ohms, at the selected point, that is, for $Rs = 2,550$ ohms, the differential output voltage E changes $(dE) = \pm 4.7$ millivolts per change in relative humidity.

The signal outputs at wiper 27 and node 35 of the bridge network 12 are extended to summing points 26 and 27' at the inputs of the operational amplifiers 21 and 22 which form the level detecting circuits 16. The operational amplifiers 21 and 22 may be, for example, the type 741 dual operational amplifier commercially available from Fairchild Semiconductor and connected for operation as open loop switching detectors. The amplifiers 21 and 22 are normally non-conducting providing a ground level output and are switched to a conducting state providing a + 16VDC output whenever the input voltage supplied to the amplifiers 21 and 22 exceeds a threshold setting for the amplifiers.

The signal E1 at wiper 27 of the set point potentiometer R5 is extended over a resistor R15 to the inverting input 41 of amplifier 21 and over a resistor R16 to the noninverting input 44 of amplifier 22. The signal E2 appearing at node 35 of the bridge network 12 is extended over a resistor R11 to the non-inverting input 43 of amplifier 21 and over a resistor R12 to the inverting input 42 of amplifier 22.

For the purpose of establishing the turn on thresholds for the operational amplifiers, the differential range adjust circuit 20, including resistors R7–R8 is connected between the summing point 26, at wiper 27 of set point potentiometer R5 and ground. Resistor R8, is a potentiometer having a wiper 48 connected to the junction of a resistors R10 and R13 which are connected in series between the inverting inputs 41 and 42 of the amplifiers 21 and 22, respectively. Resistor R7 is a variable resistor which permits calibration of the differential range adjustment.

The differential range adjust circuit 20 derives a positive reference voltage from the set point voltage E1 which is somewhat less than the set point voltage. The reference voltage is extended to the inverting inputs 41 and 42 of the amplifiers 21 and 22. The voltage variation needed to provide a 4% to 20% relative humidity differential may be represented by equation (2):

$$\Delta v = \frac{R15}{R15+R10} v_i \qquad (2)$$

where $v_i$ represents the reference voltage obtainable over the range of potentiometer R8. Furthermore, $$\Delta v = \frac{1}{2} [dE(\%R.H.)] \cdot [\text{differential range}] \qquad (3)$$

or, in the present illustration:

$$\Delta v = \frac{(4.7 \text{ mv})(20 - 4\%RH)}{2} \qquad (3')$$

and $$\Delta v = 37.7 \text{ mv}.$$

Since each of the level detectors 17 and 18 contribute one-half to the detection differential, only one-half the quantity $\Delta v$ is used.

Substituting the value for $\Delta v$ into equation (2), $v_i$ is found to equal 188 mv. Thus, the differential or reference voltage $v_i$ provided over potentiometer R8 to the amplifiers 21 and 22 is variable over approximately 188 millivolts "about" the set point voltage. Also, $v_i$ is with respect to the set point voltage E1, and tracks the set point voltage for whatever value is required to established the preselected turnon differential for the amplifiers 21 and 22. It is pointed out that although the input bias level of the threshold detectors 17 and 18 may be slightly decreased since the reference voltage is derived from the set point voltage, the set point calibration adjustment provided by potentiometer R3 of the bridge network 12 can be used to compensate for this change so that the resistance of the set point branch 32 equals the resistance of the sensor branch 31 at the appropriate humidity setting.

Resistors R10–R17 provide an input attenuation network for the amplifiers 21 and 22 and establish the gain for the amplifiers at approximately 14,500 volts/volt for the exemplary embodiment. To prevent the span of the control output from causing the controlled humidifying and dehumidifying apparatus from experiencing rapid on and off conditions, and to limit the allowable span to approximately one-half the differential adjustment so as to provide hysterisis in the control switching function, hysterisis feedback is provided by a feedback networks 47 and 48 which are connected from the outputs 45 and 46 of the operational amplifiers 21 and 22 and the non-inverting inputs 43 and 44 of the amplifiers.

Feedback network 47, associated with amplifier 21, includes resistors R14, R18, and R19. Resistors R14 and R19 are connected in series between the output 45 of amplifier 21 and the non-inverting input 43 of the amplifier. Resistor R18 is connected between the junction of resistors R14 and R19 at point 49 and ground. Similarly, feedback network 48 associated with amplifier 22 includes resistors R20 and R17 which are serially connected between the output 46 of the amplifier 22 and input 44 of the amplifier. A further resistor R21 is connected between the junction of resistors R20 and R17 at point 50 and ground.

The feedback voltage $V_h$ is given by the relationship:

$$V_h = V \left[ \frac{R18}{R18+R19} \right] \left[ \frac{R11}{R11+R14} \right] \qquad (4)$$

In the exemplary embodiment, the feedback voltage is 9.8 mv which corresponds to a 2.08% change in relative humidity.

With reference to the switching circuits 16, the output 45 of amplifier 21 is connected to the base of transistor Q2 of the dehumidifier switching circuit 23. Transistor Q2, which may be the type TiS–92 transistor, is connected for operation as an emitter follower to provide current amplification for driving the Triac Q3. Transistor Q2 has a collector connected to +V and an emitter connected over point R22 to the gate of the Triac Q4. The Triac Q4 is connected in series with a coil 53 of a control relay 52 to permit energization of de-humidifying apparatus of the system whenever amplifier 21 is enabled.

Similarly, the output 46 of amplifier 22 is connected to the base of transistor Q3 of output switching circuit 20. Transistor Q3 is also a type TIS-92 transistor connected for operation as an emitter follower to supply a gate signal to Triac Q5 which is connected in series with a coil 55 of a further control relay 54 to effect energization of humidifying apparatus of the system whenever amplifier 22 is enabled.

Operation of the Humidity Controller

For the purpose of illustrating the operation of the humidity controller circuit 10, it is assumed initially that the relative humidity within the monitored environment is at the set point value and the bridge network 12 is in a balanced condition. Accordingly, amplifiers 21 and 22 are cut off, and Triacs Q4 and Q5 are non-conducting so that the dehumidifying and humidifying apparatus is disabled.

The differential range adjust network 20 extends a positive reference voltage to the inverting inputs 41 and 42 of amplifiers 21 and 22.

In response to an increase in the humidity within the monitored area, the resistance of the humidity sensing element 11 increases causing an increase in the sensor voltage E2 at node 35 relative to the set point potential E1 at wiper 27 of the set point potentiometer R5. The sensor voltage E2 is extended over resistor R11 to the non-inverting input 43 of amplifier 21, and when the voltage E2 has increased sufficiently to overcome the reference voltage and set point voltage E1 appearing at the inverting terminal 41, amplifier 21 is switched on providing a + 16VDC output voltage at output terminal 45.

Accordingly, transistor Q2 is enabled to supply gate current to Triac Q3 which conducts to energize control relay 52 for effecting energization of the absorption humidifier to permit dehumidified air to be supplied to the monitored area.

As the relative humidity sensed by sensor 11 in the monitored area begins to decrease toward the set point, the resistance of the humidity sensor 11 also decreases causing a corresponding decrease in the sensor voltage E2.

However, the amplifier 21 is not cut off immediately due to the positive feedback voltage supplied to the noninverting input of amplifier 21 over feedback network 47. When the sensor voltage E2 has decreased toward the set point voltage, amplifier 21 turns off causing Triac Q3 to be rendered non-conductive whereby the absorption humidifier is deenergized.

Similarly, a decrease in the relative humidity within the monitored area as sensed by the humidity sensor 11 causes a decrease in the sensor voltage E2. When the sensor voltage E2 decreases sufficiently to provide a differential output voltage E1–E2 which exceeds the threshold setting for amplifier 22, amplifier 22 is turned on supplying gate current to Triac Q5 which energizes control relay 54 to enable the humidifying apparatus of the system such that humidified air is supplied to the monitored area. When a sufficient amount of humidified air has been applied to the monitored area, the differential voltage E is decreased to approximately zero, and amplifier 22 is cut off effecting deenergization of the humidifying apparatus.

The values for circuit components used in the exemplary embodiment for the humidity controller 10 are listed in Table I.

TABLE I

| | |
|---|---|
| R1=R4=R6 | 1.3K ohms |
| R2 | 2.2K ohms |
| R3 | 1.0K ohm potentiometer |
| R5 | 50 ohms potentiometer |
| R7 | 10K ohm potentiometer |
| R8 | 200 ohms potentiometer |
| R9 | 6.2K ohms |
| R10=R13 | 220K ohms |
| R11=R12 | 56K ohms. |
| =R15=R16 | |
| R14=R17 | 560K ohms |
| R18=R21 | 68 ohms |
| R19=R20 | 10K ohms |
| R22-R25 | 330 ohms |
| C1 | 500 microfarads |
| CR1 | IN 4003 |
| CR2 | B2X61-C15 |
| CR3-CR5 | T155 |

The component values listed above are for an exemplary embodiment for the humidity controller 10 and are not intended as a limitation of the scope of the invention.

I claim:

1. In an environmental control system, a humidity controller responsive to a humidity sensing means for controlling apparatus of the system to provide compensation for changes in the humidity within a given area relative to a set point as sensed by a sensing means, said humidity controller comprising a sensing network including said humidity sensing means and set point means for establishing said set point, said sensing network being operable to provide a differential output indicative of the relative humidity within the area, and control means including first and second threshold detecting means and threshold means including said setpoint means for establishing different turnon thresholds for said first and second threshold detecting means to enable said control means to provide a first control for said system apparatus in response to a differential output of one polarity provided by said sensing network and a second control signal for said system apparatus in response to a differential output of the opposite polarity provided by said sensing network.

2. An environmental control system as set forth in claim 1 wherein said set point means is adjustable to permit selection of the set point value and wherein said threshold means establishes a detection differential for said first and second threshold detecting means which remains constant for different set point values.

3. An environmental control system as set forth in claim 2 wherein said threshold means includes means for adjusting the detection differential for said first and second threshold detecting means.

4. An environmental control system as set forth in claim 2 wherein said set point means establishes a set point voltage at an output thereof which is indicative of the selected set point value, and said threshold means includes circuit means connected to said output of said set point means for supplying a reference voltage derived from said set point voltage to inputs of said first and second threshold detecting means to establish said detection differential for said first and second threshold detecting means.

5. An environmental control system as set forth in claim 2 wherein said first threshold detecting means includes means for increasing the differential output of said sensing network whenever said first threshold detecting means is enabled and wherein said second threshold detecting means includes means for increasing the differential output of said sensing network whenever said second threshold detecting means is enabled.

6. An environmental control system as set forth in claim 1 wherein said humidity sensing means comprises a resistance-type humidity sensing element having a resistance characteristic that varies non-linearly with changes in relative humidity and wherein said sensing network includes means for adjusting the differential output to compensate for the non-linearity of the sensing element.

7. In an environmental control system, a humidity controller responsive to a humidity sensor which monitors the humidity within a given area for controlling apparatus of the system to provide compensation for changes in the humidity within the monitored area relative to a set point value as sensed by the humidity sensor, said humidity controller comprising a sensing means including said humidity sensor and set point means, said humidity sensor establishing a sensor voltage indicative of the relative humidity within the monitored area at an output of said sensing means and said set point means establishing a set point voltage indicative of the desired humidity for the monitored area at a second output of said sensing means, detector means including first and second threshold detecting means having inputs connected to said outputs of said sensing means, and threshold means for deriving a reference voltage from said set point voltage which is extended to inputs of said first and second threshold detecting means to establish a first turn on threshold for said first threshold detecting means and a second turn on threshold for said second threshold detecting means whereby said first threshold detecting means is enabled to provide a first control signal whenever the sensor voltage increases relative to said set point voltage by an amount greater than the first threshold value and said second threshold detecting means is enabled to provide a second control signal whenever the sensor voltage decreases relative to said set point voltage by an amount greater than said second threshold value, first switching means responsive to said first control signal to effect energization of a first apparatus of the system to effect a decrease in the humidity in the monitored area, and second switching means responsive to said second control signal to effect energization of a second apparatus of the system to effect an increase in the humidity in the monitored area.

8. An environmental control system as set forth in claim 7 wherein said sensing means comprises a bridge network having said humidity sensor connected in a first branch of said bridge network and said set point means connected in a second branch of said bridge network, and means for applying an energizing potential to said bridge network to enable said sensor voltage and said set point voltage to be provided at first and second outputs of said bridge network.

9. An environmental control system as set forth in claim 8 wherein said bridge network includes means connected in a further branch of said bridge network for balancing the bridge network to permit the sensor voltage to equal the set point voltage when the humidity in the monitored area is at the set point value.

10. An environmental control system as set forth in claim 7 wherein said threshold means includes circuit means connected to said second output of said sensing means for deriving said reference voltage from said set point voltage and for extending said reference voltage to inputs of said first and second threshold detecting means.

11. An environmental control system as set forth in claim 10 wherein said circuit means includes means for adjusting the amplitude of the reference voltage to thereby vary the range of the differential thresholds for said first and second threshold detecting means.

12. An environmental control system as set forth in claim 8 wherein said first threshold detecting means includes feedback means for extending a portion of said first control signal to an input of said first threshold detecting means to maintain said first switching means enabled until said sensor voltage decreases to the value of said set point voltage and said second threshold detecting means includes further feedback means for extending a portion of said second control signal to an input of said second threshold detecting means to maintain said second switching means enabled until said sensor voltage increases to the value of said set point voltage.

13. An environmental control system as set forth in claim 10 wherein said first and second threshold detecting means comprise first and second operational amplifier means, respectively, each connected for operation as an open loop switching circuit.

14. An environmental control system as set forth in claim 13 wherein said detector means includes input network means having means for extending the set point voltage to an inverting input of said first operational amplifier means and to a non-inverting input of said second operational amplifier means and means for extending the sensor voltage to a non-inverting input of said first operational amplifier means and to an inverting input of said second operational amplifier means.

15. An environmental control system as set forth in claim 14 wherein said threshold means includes resistance means having potentiometer means connected between said second output of said sensing means and a point of reference potential to provide said reference signal at a wiper of said potentiometer means, and means for connecting said wiper of said potentiometer means to said inverting inputs of said first and second operational amplifier means.

* * * * *

UNITED STATES PATENT AND TRADEMARK OFFICE
CERTIFICATE OF CORRECTION

PATENT NO. : 3,957,200
DATED : May 18, 1976
INVENTOR(S) : Geoffrey Allen Young

It is certified that error appears in the above–identified patent and that said Letters Patent are hereby corrected as shown below:

Column 8, line 31, after "control", second occurrence, insert -- signal --.

Signed and Sealed this

Seventh Day of September 1976

[SEAL]

Attest:

RUTH C. MASON
*Attesting Officer*

C. MARSHALL DANN
*Commissioner of Patents and Trademarks*